US012641330B2

(12) United States Patent
Suzuki et al.

(10) Patent No.: US 12,641,330 B2
(45) Date of Patent: May 26, 2026

(54) IMAGING DEVICE WITH PROTECTED BOARD

(71) Applicant: DENSO CORPORATION, Kariya-city (JP)

(72) Inventors: Yoshihiro Suzuki, Kariya-city (JP); Shunya Yamamori, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 87 days.

(21) Appl. No.: 18/645,224

(22) Filed: Apr. 24, 2024

(65) Prior Publication Data

US 2024/0364985 A1 Oct. 31, 2024

(30) Foreign Application Priority Data

Apr. 26, 2023 (JP) ................................. 2023-072619

(51) Int. Cl.
*H04N 23/51* (2023.01)
*H04N 23/54* (2023.01)

(52) U.S. Cl.
CPC ............. *H04N 23/51* (2023.01); *H04N 23/54* (2023.01)

(58) Field of Classification Search
CPC ........ H04N 23/51; H04N 23/54; H04N 23/52; H04N 23/55; H04N 23/57; H04N 23/50; B60R 1/20
See application file for complete search history.

(56) References Cited

U.S. PATENT DOCUMENTS

| | | | |
|---|---|---|---|
| 2012/0155855 A1 | 6/2012 | Okuda | |
| 2016/0023620 A1* | 1/2016 | Matori | B60R 11/04 |
| | | | 348/148 |
| 2017/0182944 A1* | 6/2017 | Achenbach | B60K 35/60 |
| 2019/0068860 A1* | 2/2019 | Sakamoto | G02B 7/008 |
| 2020/0053258 A1* | 2/2020 | Park | H04N 23/52 |
| 2021/0058537 A1* | 2/2021 | Saito | G02B 7/02 |
| 2022/0009425 A1* | 1/2022 | Tokito | G03B 30/00 |
| 2023/0080778 A1* | 3/2023 | Owaki | B60R 11/04 |
| | | | 348/148 |
| 2025/0039522 A1* | 1/2025 | Harada | H04N 23/51 |

\* cited by examiner

*Primary Examiner* — Padma Haliyur
(74) *Attorney, Agent, or Firm* — Precision Patents, P.C.

(57) ABSTRACT

An imaging device includes a camera module which includes a lens, a lens holder, and an image sensor. The imaging device also includes a circuit board, a case, and a cover which defines an inner chamber along with the case in which the lens, the holder, and the image sensor are disposed. The case includes an opening-defining portion which defines an opening through which the holder is inserted. The opening-defining portion includes a first wall, a second wall, and a shield. The first wall is located between the holder and the board. The second wall is arranged on an opposite side of the holder to the first wall. The shield extends from the first wall between the holder and the board in the inner chamber defined by the case and the cover. The shield works to block adhesion of foreign matter to the circuit board.

9 Claims, 7 Drawing Sheets

IMAGING DEVICE WITH PROTECTED BOARD

CROSS REFERENCE TO RELATED DOCUMENT

The present application claims the benefit of priority of Japanese Patent Application No. 2023-072619 filed on Apr. 26, 2023, the disclosure of which is incorporated in its entirety herein by reference.

TECHNICAL FIELD

This disclosure relates generally to an imaging device.

BACKGROUND ART

Japanese patent first publication No. 2012-133100 teaches an imaging device used as a vehicle-mounted camera equipped with a lens exposed outside a housing from an upper surface of the housing.

The above vehicle-mounted camera is designed to have two discrete parts: the housing and the lens assembled together, so that a clearance is inevitably created between the housing and the lens, thus resulting in a risk that foreign matter, such as drops of water, may enter the housing via the clearance. The vehicle-mounted camera has disposed in the housing a printed circuit board on which electronic parts are mounted. Adhesion of foreign matter, as having entered the housing, to the printed circuit board, may result in a defect, such as a short circuit, on the printed circuit board.

It is an object of this disclosure to provide an imaging device capable of minimizing adhesion of foreign matter to a circuit board disposed inside the imaging device.

According to one aspect of this disclosure, there is provided an imaging device which comprises: (a) a camera module which includes a lens, a holder in which the lens is disposed, and an image sensor which captures an image using light having passed through the lens and outputs the captured image in a form of an electrical signal; (b) a board which derives the electrical signal from the image sensor; (c) a case; and (d) a cover which defines an inner chamber along with the case in which the lens, the holder, and the image sensor are disposed. The case includes an opening-defining portion which defines an opening through which the holder is inserted. The opening-defining portion includes a first wall, a second wall, and a shield. The first wall is located between the holder and the board. The second wall is arranged on an opposite side of the holder to the first wall. The shield extends from the first wall in a first direction and is located between the holder and the board in the inner chamber defined by the case and the cover.

The above structure of the imaging device causes foreign matter, as having passed through a clearance between the holder and the opening-defining portion, to be attached to the shield before reaching the board, thereby minimizing a risk that the foreign matter may become adhered to the board disposed inside the imagine device.

In this disclosure, reference numbers or symbols in brackets represent correspondence relations to elements discussed in embodiments, as described below.

BRIEF DESCRIPTION OF THE DRAWINGS

The present disclosure will be understood more fully from the detailed description given hereinbelow and from the accompanying drawings of the preferred embodiment of the invention, which, should not be taken to limit the invention to the specific embodiment but are for the purpose of explanation and understanding only.

In the drawings.

DESCRIPTION OF THE PREFERRED EMBODIMENTS

The embodiments will be described below with reference to the drawings. Parts of the embodiments functionally or structurally corresponding to each other or associated with each other will be denoted by the same reference numbers for brevity of explanation.

First Embodiment

The imaging device 20 in this embodiment is designed to minimize a risk that foreign matter may be attached to a circuit board disposed in the imaging device 20. The imaging device 20 is used with, for example, vehicles, such as automobiles. One of such a type of vehicles will first be described below.

Figure 1:
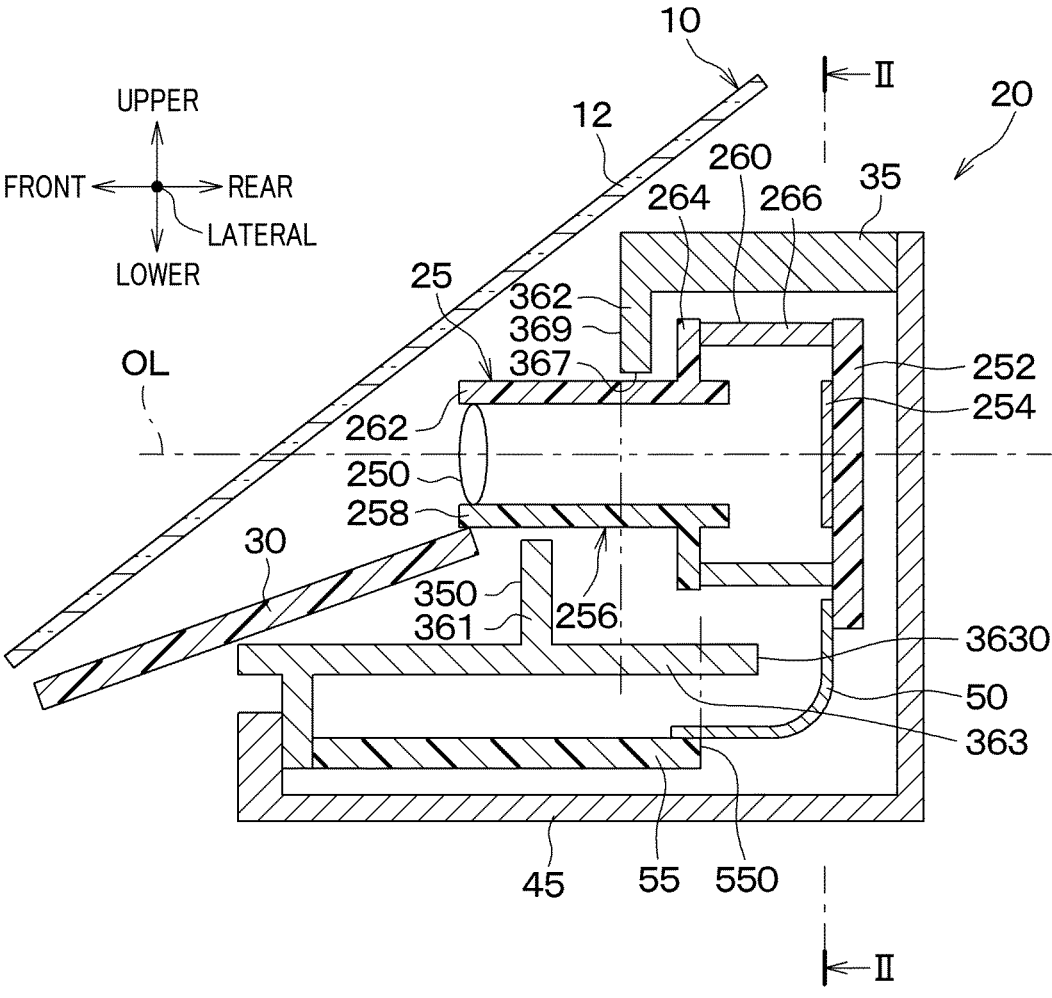
FIG. 1 is a cross sectional view of an imaging device according to the first embodiment.

The vehicle 10, as illustrated in FIG. 1, includes the windshield 12 and the imaging device 20. The windshield 12 is used for a driver of the vehicle 10 to secure a field of vision in front of the vehicle 10.

The imaging device 20 is implemented by, for example, a monocular camera working to capture an image of a frontward view in front of the vehicle 10. The imaging device 20 may alternatively be implemented by a compound eye camera. The imaging device 20 may alternatively be arranged to capture an image of a surround view, such as a side view on the right or left side of the vehicle 10 or a rearward view in the rear of the vehicle 10.

The imaging device 20, as illustrated in FIGS. 1 to 5, includes the camera module 25, the hood 30, the case 35, the first fastener 41, the second fastener 42, the cover 45, and the board-to-board connecting member 50. The imaging device 20 also includes the first terminals 51, the second terminals 52, the processor board 55, the first connector housing 61, and the second connector housing 62.

The camera module 25 includes the lens 250, the imaging board 252, the image sensor 254, and the holder 256.

The lens 250 works to collect rays of light from outside the front of the vehicle 10 for capturing an image of the frontward view in front of the vehicle 10. The lens 250 has the optical axis OL extending in the longitudinal direction of the vehicle 10.

The imaging board 252 is made of a printed-circuit board. The image sensor 254 is made of a semiconductor image sensor, such as a CMOS image sensor. The image sensor 254 is mounted on a surface of the imaging board 252 which faces the lens 250 in the longitudinal direction of the vehicle 10, so that the image sensor 254 captures light having passed through the lens 250 and converts it to create and output an image in the form of an electrical signal.

The holder 256 includes the lens holder 258, the connecting holder member 260, and the holder ends 268. The lens holder 258 is made from resin. The lens holder 258 includes the lens holder body 262 and the lens holder flange 264.

The lens holder body 262 is of a hollow column-shape and has the lens 250 disposed therein. The lens holder flange 264 extends from the lens holder body 262 in a direction perpendicular, e.g., orthogonal to the optical axis OL.

The connecting holder member 260 is made from a metallic material, such as aluminum, which is light in weight and high in mechanical strength and thermal conductivity. The connecting holder member 260 includes the connecting holder body 266, the first flange 271, and the second flange 272.

Figure 2:
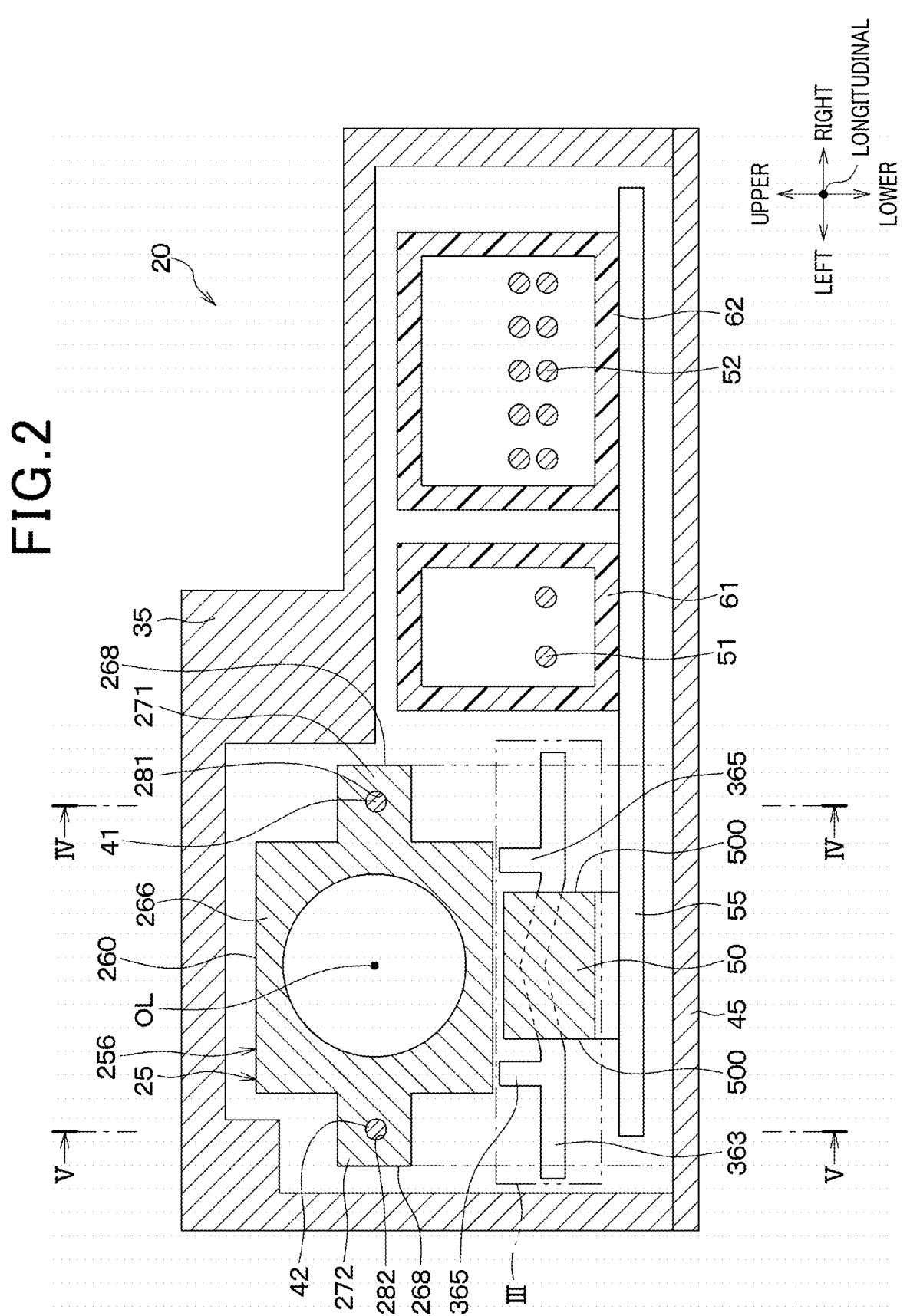
FIG. 2 is a cross sectional view taken along the line II-II in FIG. 1.

The connecting holder body 266 is, as can be seen in FIG. 2, of a hollow column shape having a square outer periphery in cross section and a circular inner periphery in cross section to define a cylindrical inner chamber through which light is permitted to pass. The connecting holder body 266, as illustrated in FIG. 1, has a front end which faces the frontward view in front of the vehicle 10 and is attached using adhesive or screws to a portion of the lens holder flange 264 facing in the longitudinal direction of the vehicle 10. The connecting holder body 266 also has a rear end which faces the rear of the vehicle 10 and is attached using adhesive or screws to a portion of the imaging board 252 facing in the longitudinal direction of the vehicle 10. Light, as having passed through the lens 250, travels within the connecting holder body 266 and then enters the image sensor 254.

Figure 3:
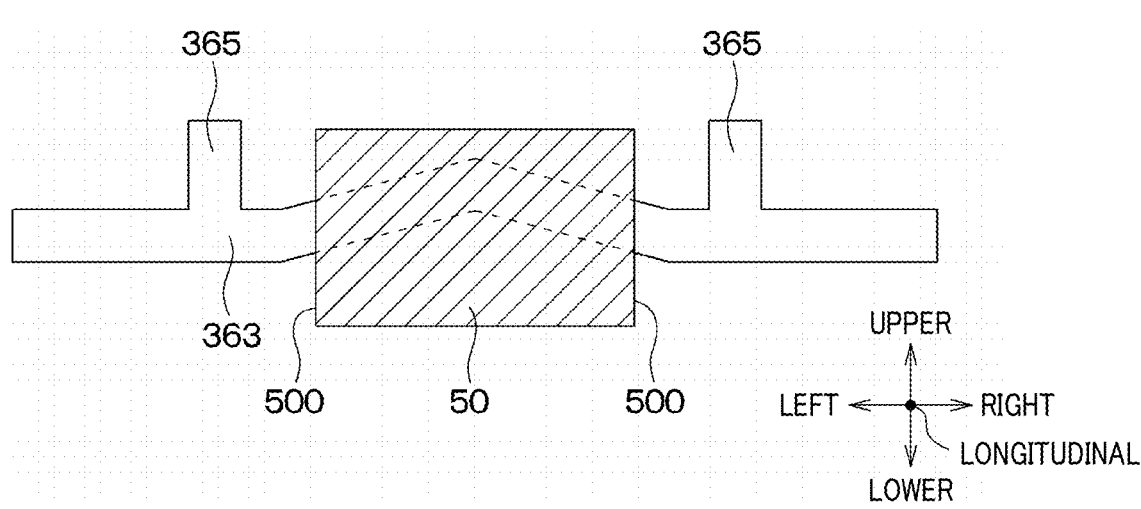
FIG. 3 is a cross sectional view taken along the line III-III in FIG. 2.

The first flange 271, as can be seen in FIG. 2, extends in the rightward direction of the vehicle 10 from a first portion of the connecting holder body 266 which is located close to the first connector housing 61 (which will described later in detail). The first flange 271, as illustrated in FIGS. 2 and 3, has formed therein the first flange hole 281 extending in the longitudinal direction of the vehicle 10.

Figure 5:
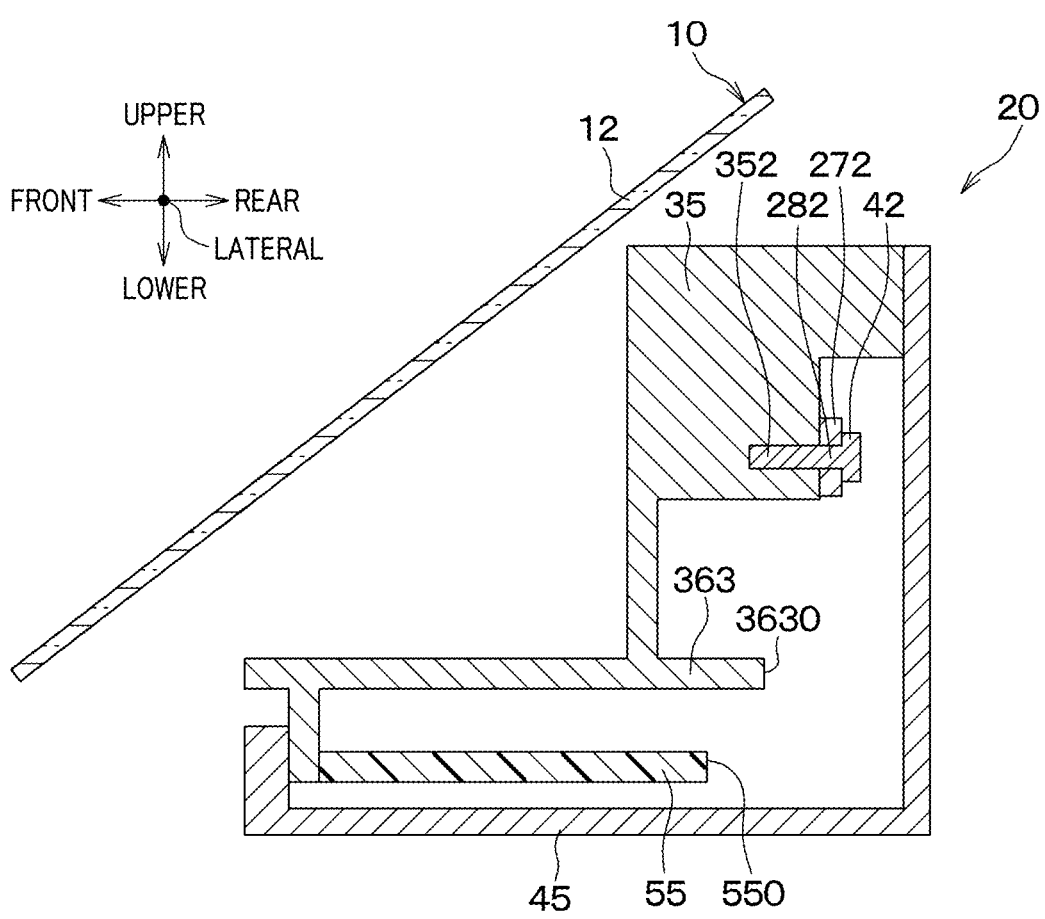
FIG. 5 is a cross sectional view taken along the line V-V in FIG. 2.

The second flange 272, as illustrated in FIG. 2, extends from a second portion of the connecting holder body 266 located away from the first portion from which the first flange 271 extends. In other words, the second flange 272 extends away from the first flange 271 in the leftward direction of the vehicle 10. The second flange 272, as illustrated in FIGS. 2 and 5, has formed therein the second flange hole 282 which extends in the longitudinal direction of the vehicle 10.

The holder ends 268 are ends of the holder 256 which face in a second direction that is a direction defined perpendicular both to the optical axis OL and to a direction oriented from the first wall 361 to the second wall 362. In this embodiment, the direction in which the optical axis OL extends, as can be seen in FIG. 1, corresponds to the longitudinal direction of the vehicle 10. The direction oriented from the first wall 361 to the second wall 362 corresponds to the vertical direction of the vehicle 10. The second direction referred to herein, as can be seen in FIG. 2, is a direction perpendicular both to the longitudinal direction of the vehicle 10 and the vertical direction of the vehicle 10, that is, the lateral direction of the vehicle 10. The holder 256 is formed to have the first flange 271 extending in the rightward direction of the vehicle 10 and the second flange extending in the leftward direction of the vehicle. The holder ends 268, therefore, correspond to ends of the first flange 271 and the second flange 272 which face the lateral direction of the vehicle 10.

The hood 30 is, as illustrated in FIG. 1, arranged on a portion of the lens holder 258 which is located below the front of the vehicle 10. The hood 30 is of a plate-like shape made from a black antireflective material or plastic to block entry of light, as coming from below the imaging device 20 in the vehicle 10 or inside the vehicle 10, into the lens 250.

The case 35 illustrated in FIGS. 1 to 5 is made from a metallic material, such as aluminum, which is light in weight and high in mechanical strength and thermal conductivity. The case 35 has the opening-defining portion 350, the first case hole 351, and the second case hole 352 formed therein.

The lens holder body 262, as can be seen in FIG. 1, has a portion inserted into an opening defined by the opening-defining portion 350 of the case 35. The opening-defining portion 350 includes the first wall 361, the second wall 362, the shield 363 (serving as a guard which will be described later in detail), and the protruding portions 365.

The first wall 361 lies between the holder 256 and the processor board 55 which will be described later in detail. The second wall 362 is located on the opposite side of the holder 256 to the first wall 361. The second wall 362 is located closer to the rear of the vehicle 10 than the first wall 361 is. The opening-defining portion 350, therefore, opens both in the longitudinal direction of the vehicle 10 and in the vertical direction of the vehicle 10. The second wall 362 includes the holder-facing surface 367 and the outer surface 369.

The holder-facing surface 367 is oriented to face the lens holder body 262 in the vertical direction of the vehicle 10.

The outer surface 369 extends to intersect the holder-facing surface 367. The outer surface 369 connects with the holder-facing surface 367 and faces outward away from the case 35. For instance, the outer surface 369 extends perpendicular to the holder-facing surface 367 and faces forward of the vehicle 10.

The shield 363 extends from the first wall 361 in a first direction. For instance, the shield 363 extends along the optical axis OL of the lens 250 or in the longitudinal direction of the vehicle 10. The shield 363 is disposed inside an inner chamber defined by the case 35 and the cover 45 which will be described later and located between the holder 256 and the processor board 55 which will be described later. The shield 363 is formed integrally with the first wall 361, but however, may alternatively be made as a member discrete from the first wall 361.

The shield 363 extend in the first direction to have the end 3630 which is located closer to the rear of the vehicle 10 than the outer surface 369 is. The shield 363, as described later in detail with reference to FIGS. 2 and 3, has a portion which overlaps the board-to-board connecting member 50 (which will be described later) in the first direction and is inclined in the lateral direction of the vehicle 10. The portion of the shield 363 which overlaps the board-to-board connecting member 50 in the first direction is shaped to protrude or bulge upward of the vehicle 10, so that it slants in the leftward and rightward directions of the vehicle 10, but however, may alternatively be shaped to protrude or bulge downward of the vehicle 10, so that it slants in the leftward and rightward directions of the vehicle 10.

The protruding portions 365 extend from the shield 363 toward the holder 256, i.e., in the upward direction of the vehicle 10.

Figure 4:
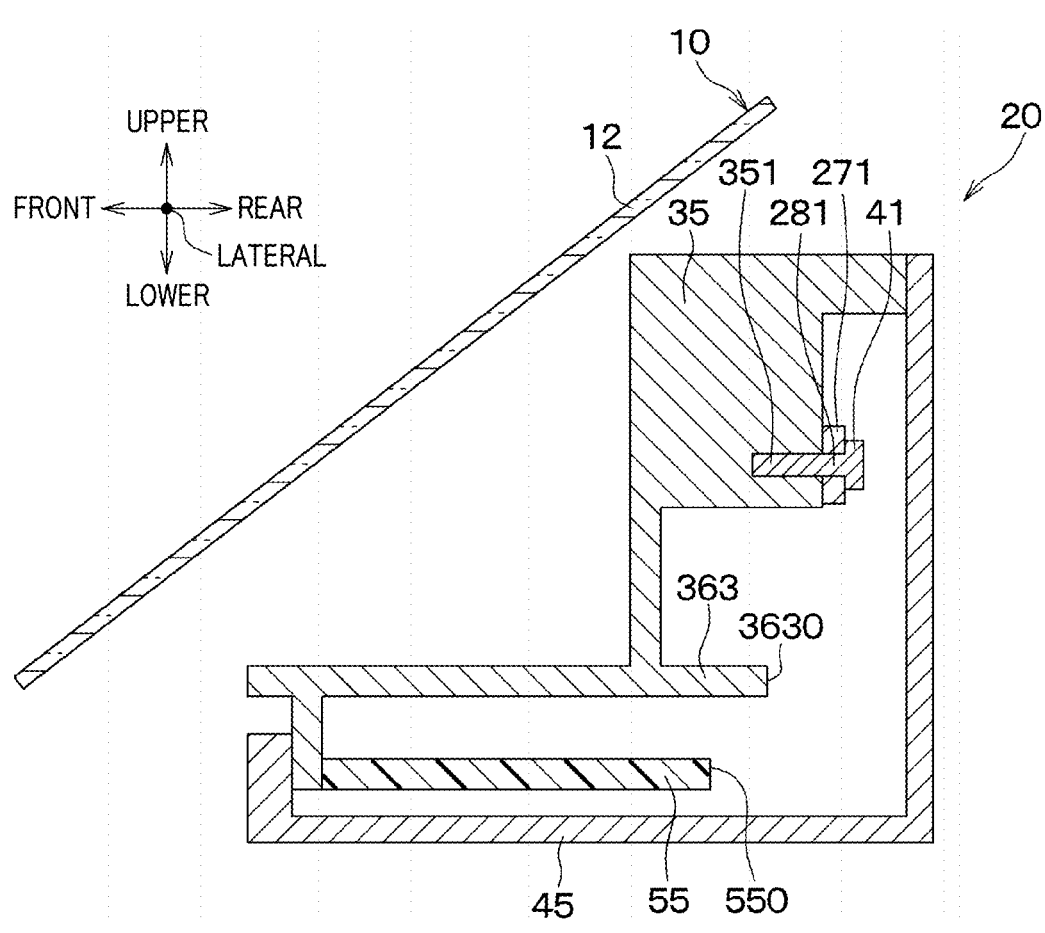
FIG. 4 is a cross sectional view taken along the line IV-IV in FIG. 2.

The first case hole 351, as can be seen in FIG. 4, extends in the longitudinal direction of the vehicle 10 in alignment with the first flange hole 281. In other words, the first case hole 351 communicates with the first flange hole 281.

The second case hole 352, as can be seen in FIG. 5, extends in the longitudinal direction of the vehicle 10 in alignment with the second flange hole 282. In other words, the second case hole 352 communicates with the second flange hole 282.

The first fastener 41 is implemented by a screw which is, as illustrated in FIG. 4, inserted into the first flange hole 281 and the first case hole 351. Similarly, the second fastener 42 is implemented by a screw which is, as illustrated in FIG. 5, inserted into the second flange hole 282 and the second case hole 352. This achieves a mechanical joint between the case 35 and the lens holder 258, thereby securing the case 35 and the camera module 25 to each other. The joint of the case 35 and the camera module 25 may alternatively be achieved using adhesive or by interlocking a convex and a concave part with each other which are formed on and in the case 35 and the camera module 25 instead of the first fastener 41 and the second fastener 42.

The cover 45 illustrated in FIGS. 1 to 5 is made from a metallic material, such as aluminum, which is light in weight and high in mechanical strength and thermal conductivity. The cover 45 defines an inner chamber along with the case 35 in which the camera module 25 is disposed. The cover 45 is secured to the case 35 and the imaging board 252 using, for example, screws.

The board-to-board connecting member 50 is made of, for example, an FPC (i.e., flexible printed circuit) and, as illustrated in FIGS. 1 and 2, disposed in the inner chamber defined by the case 35 and the cover 45. The board-to-board connecting member 50 also connects with the imaging board 252 and the processor board 55 which will be described later in detail.

The board-to-board connecting member 50 has the connecting member ends 500. The connecting member ends 500 are defined by ends of the board-to-board connecting member 50 which face in the lateral direction of the vehicle 10. The connecting member ends 500 are located inside the holder ends 268 in the lateral direction of the vehicle 10. The protruding portions 365 are arranged between the connecting member ends 500 and the holder ends 268 in the lateral direction of the vehicle 10.

The first pins 51 and the second pins 52 connect with a power supply not shown, a display not shown, an interface leading to an external server not shown, a driver assistance system not shown, and a driver's condition monitoring system not shown. The first pins 51 and the second pins 52 are connected using solder to the processor board 55 which will be described later in detail.

The processor board 55 is made of a printed circuit board and disposed in the inner chamber defined by the case 35 and the cover 45. The processor board 55, as clearly illustrated in FIG. 1, has the board end 550. The board end 550 is defined by an end of the processor board 55 which faces the rear of the vehicle 10. The board end 550 is located closer to the front of the vehicle 10 than the end 3630 of the shield 363 is. In other words, the end 3630 of the shield 363 is located closer to the rear of the vehicle 10 than the board end 550 is. The processor board 55 has a microcomputer, a ROM, a RAM, etc., mounted thereon. The microcomputer on the processor board 55 operates on electrical power delivered from a power supply not shown. The microcomputer on the processor board 55 also works to execute a program stored in the ROM to obtain an image captured by the image sensor 254 in the form of an electrical signal through the imaging board 252 and the board-to-board connecting member 50.

Specifically, the microcomputer on the processor board 55 instructs the not-shown display to display the captured image. The microcomputer also processes the captured image using image recognition techniques. The microcomputer also outputs the captured image and results of the processing of the captured image in the form of electrical signals to the interface leading to the external server not shown and the not-shown driver assistance system using the first pins 51 or the second pins 52.

The not-shown interface obtains the electrical signals indicative of the captured image and the results of the processing of the captured image and outputs them to the external server. The external server stores therein data on the captured image and the results of the processing of the captured image.

The not-shown driver assistance system obtains the signals indicative of the results of the processing of the captured image to perform driver's assistance tasks, such as an alarm output control and an operation control of the vehicle 10. The alarm output control is a system serving to sound an alarm when the driver in the vehicle 10 is likely or expected to depart its lane. The operation control of the vehicle 10 is a system serving to perform a steering control task or a braking control task to keep the vehicle 10 traveling within the lane.

The microcomputer on the processor board 55 also executes a program stored in the ROM to obtain a condition of the driver from the driver's condition monitoring system not shown and then performs an image recognition task to process the captured image using the condition of the driver. For instance, when the driver is unconscious, so that the driver is unable to operate the vehicle 10, the microcomputer on the processor board 55 analyzes the captured image to search for a place where the vehicle 10 can be parked in safety. The microcomputer also outputs the searched place in the form of an electrical signal to the driver assistance system not shown using the first pins 51 or the second pins 52. The driver assistance system receives the signal outputted from the microcomputer to move and park the vehicle 10 at the searched place.

The first connector housing 61 is, as can be seen in FIG. 2, made from resin into a hollow column with a bottom and has the first pins 51 disposed therein. The first connector housing 61 is firmly secured to the processor board 55. The first connector housing 61 is arranged adjacent to the connecting holder body 266 in the lateral direction of the vehicle 10.

The second connector housing 62 is, like the first connector housing 61, made from resin into a hollow column with a bottom and has the second pins 52 disposed therein. The second connector housing 62 is firmly secured to the processor board 55. The camera module 25, the first connector housing 61, and the second connector housing 62 are arranged adjacent to each other in the lateral direction of the vehicle 10. The first connector housing 61 is arranged between the camera module 25 and the second connector housing 62 in the lateral direction of the vehicle 10.

The vehicle 10 equipped with the imaging device 20 is designed to have the above-described structure. Next, how to minimize adhesion of foreign matter to the processor board 55 installed in the imaging device 20 will be described.

In the imaging device 20, the case 35 is, as clearly illustrated in FIG. 1, equipped with the opening-defining portion 350. The holder 256 is inserted into the opening formed by the opening-defining portion 350. The opening-defining portion 350 includes the shield 363. The shield 363 extends from the first wall 361 in the first direction in which the optical axis OL extends, i.e., the rearward direction of the vehicle 10. The shield 363 is arranged between the holder 256 and the processor board 55 within the inner chamber defined by the case 35 and the cover 45.

In the above structure, foreign matter which has entered a clearance between the holder 256 and the opening-defining portion 350 will be attached to the shield 363 before reaching the processor board 55. This eliminates a risk that foreign matter may be adhered to the processor board 55 arranged inside the imaging device 20.

The imaging device 20 in the first embodiment produces the following beneficial advantages.

1-1 The shield 363 is, as clearly illustrated in FIG. 1, formed integrally with the first wall 361, thereby eliminating a risk that a clearance may be created between the shield 363 and the first wall 361, as compared with a case where the shield 363 and the first wall 361 are made of discrete members. This avoids attachment of foreign matter entering from between the shield 363 and the first wall 361, to the processor board 55. The one-piece formation or unitary construction of the shield 363 and the first wall 361 eliminates the need for securing the shield 363 to the first wall 361, which facilitates the formation of the shield 363, as compared with a case where the shield 363 and the first wall 361 are made of discrete members.

1-2 The end 3630 of the shield 363 is, as can be seen in FIG. 1, arranged away from the outer surface 369 in the first direction, in other words, located closer to the rear of the vehicle 10 than the outer surface 369 is.

The above layout of the end 3630 facilitates attachment of foreign matter, as having entered at a clearance between the holder 256 and the opening-defining portion 350, to the shield 363 before reaching the processor board 55, thereby minimizing a risk of adhesion of foreign matter to the processor board 55.

1-3 The end 3630 of the shield 363 is, as can be seen in FIG. 1, arranged away from the board end 550 in the first direction, in other words, located closer to the rear of the vehicle 10 than the board end 550 is.

The above layout of the end 3630 facilitates attachment of foreign matter, as having entered at a clearance between the holder 256 and the opening-defining portion 350, to the shield 363 before reaching the processor board 55, thereby minimizing a risk of adhesion of foreign matter to the processor board 55.

1-4 The camera module 25, as illustrated in FIG. 1, includes the imaging board 252 on which the image sensor 254 is mounted. The holder 256, as can be seen in FIG. 2, has the holder ends 268 facing in a direction different from the first direction (i.e., the second direction perpendicular to the first direction in this embodiment). The imaging device 20 includes the board-to-board connecting member 50 connecting with the processor board 55 and the imaging board 252. The board-to-board connecting member 50 has the connecting member ends 500 facing in the second direction. The connecting member ends 500 are located more inward than the holder ends 268 in the second direction, in other words, closer to the optical axis OL than the holder ends 268 are in the second direction. The opening-defining portion 350, as illustrated in FIGS. 2 and 3, includes the protruding portions 365. The protruding portions 365 extend in a direction from the shield 363 to the holder 256, that is, the vertical direction of the vehicle 10. Each of the protruding portions 365 is arranged between one of the holder ends 268 and an adjacent one of the connecting member ends 500 in the second direction. The processor board 55 is also referred to as a first board or a first circuit board. The imaging board 252 is also referred to as a second board or a second circuit board. The second direction, as referred to in this embodiment, is the lateral direction of the vehicle 10.

The above arrangements eliminate a risk that foreign matter, as traveling on the holder ends 268, may be moved to the board-to-board connecting member 50, thus avoiding adhesion of the foreign matter, as coming from the holder ends 268, to the board-to-board connecting member 50.

1-5 The joint of the board-to-board connecting member 50 and the imaging board 252 is, as can be seen in FIG. 1, located away from the shield 363 in the first direction, i.e., closer to the rear of the vehicle 10 than the shield 363 is. The shield 363, as clearly illustrated in FIGS. 2 and 3, slants downward from the center thereof in the second direction.

The above arrangements facilitate movement of foreign matter attached to the shield 363 in the second direction. This minimizes a risk that foreign matter, having entered at a clearance between the holder 256 and the opening-defining portion 350, may be adhered to the board-to-board connecting member 50.

1-6 When a slant member, such as the windshield 12, is located at an increased distance from the lens 250, it enhances the possibility that light, as having passed through the slant member, will undergo reflection outside the imaging device 20 depending upon the increased distance, so that the reflected light may pass through the lens 250. This results in need for increasing the size of the hood 30 in order to reduce the risk of reflection of light passing through the slant member.

In order to alleviate the above drawback, the imaging device 20 is, as can be seen in FIG. 1, designed to have the second wall 362 which is located away from the first wall 361 in the first direction, i.e., closer to the rear of the vehicle 10 than the first wall 361 is.

The above layout of the first wall 361 and the second wall 362 facilitates avoidance of interference between the slant member (i.e., the windshield 12) and the second wall 362. This enables the slant member to be located close to the lens 250, thereby minimizing a risk that light passing through the slant member may be reflected outside the imaging device 20 as compared with when the slant member is located away from the lens 250. This enables the hood 30 to be reduced in size thereof, which also enables the imaging device 20 may be designed to have a decreased size.

Second Embodiment

The second embodiment is different in structure of the shield 363 from the first embodiment. Other arrangements are identical with those in the first embodiment, and explanation thereof in detail will be omitted here.

Figure 6:
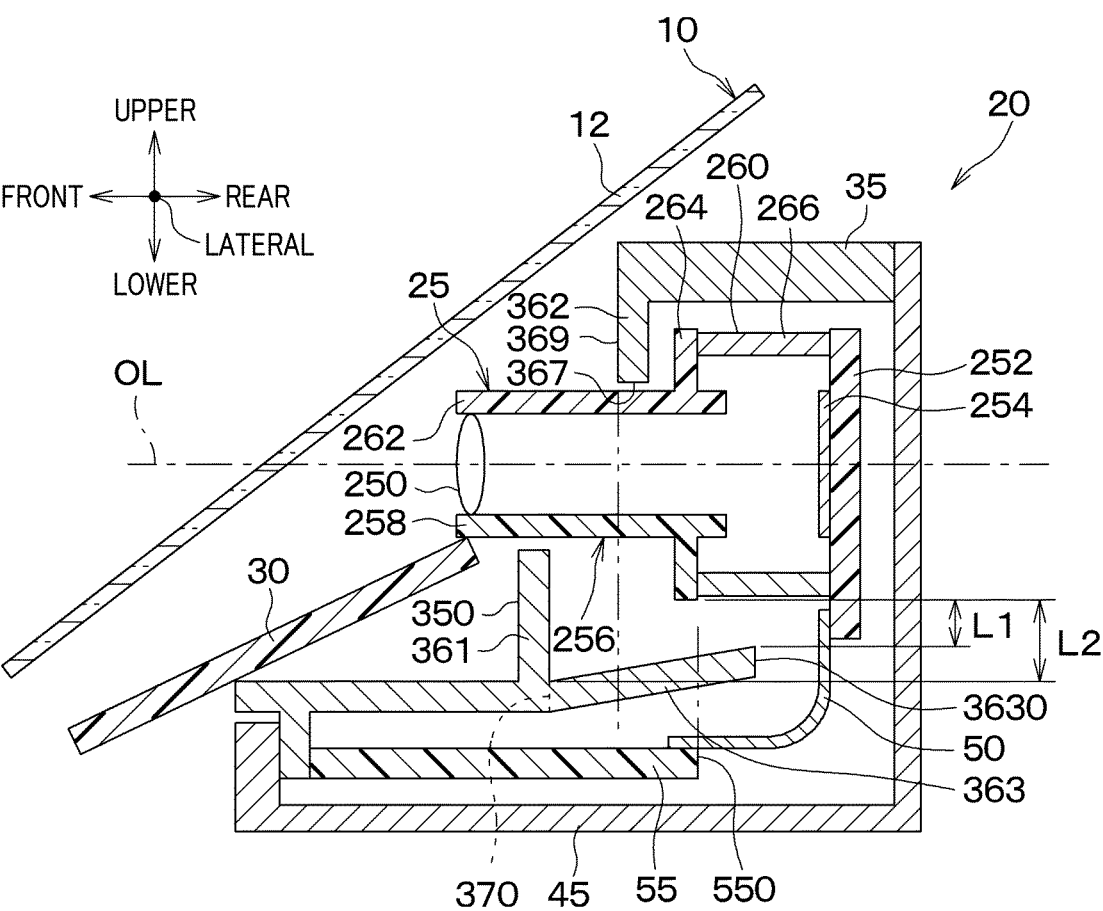
FIG. 6 is a cross sectional view of an imaging device according to the second embodiment.

The shield 363 is, as illustrated in FIG. 6, inclined from a joint thereof to the first wall 361 at a preselected angle to the optical axis OL without extending straight parallel to the optical axis OL. This causes the first distance L1 to be shorter than the second distance L2. The first distance L1 is a minimum distance between the end 3630 of the shield 363 and the holder 256 in a direction perpendicular to the optical axis OL. The second distance L2 is a minimum distance between the holder 256 and the boundary 370 of the shield 363 and the first wall 361 in the direction perpendicular to the optical axis OL.

The imaging device 20 in the second embodiment is designed to have the above-described structure. The second embodiment offers substantially the same beneficial advantages as those in the first embodiment and also produce additional advantages discussed below.

2 The shield 363 is, as described above, oriented to slant relative to the optical axis OL to have the first distance L1 smaller than the second distance L2.

The above geometry of the shield 363 urges movement of foreign matter, as attached to the shield 363, from the end 3630 of the shield 363 toward the boundary 370, so that the foreign matter will be accumulated around the boundary 370, thereby minimizing a risk that foreign matter, as entering at a clearance between the holder 256 and the opening-defining portion 350, may reach the processor board 55. This enhances avoidance of foreign matter to the processor board 55.

Other Embodiments

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

The controllers or how to construct them referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations thereof referred to in this disclosure may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium.

The above embodiment uses the imaging device 20 in the vehicle 10, but however, the imaging device 20 may alternatively be installed in facilities.

In the above embodiment, the not-shown driver assistance system analyzes the results of the processing of the captured image made by the microcomputer fabricated on the processor board 55 to perform the driver's assistance task, such as an alarm output control task or a vehicle operation control task in the vehicle 10, but however, may alternatively be designed to use an output from a Lidar (i.e., Light Detection and Ranging, Laser Imaging Detection and Ranging) installed in the vehicle 10 in addition to the results of the processing of the captured image made by the microcomputer on the processor board 55 to perform the driver's assistance task.

Figure 7:
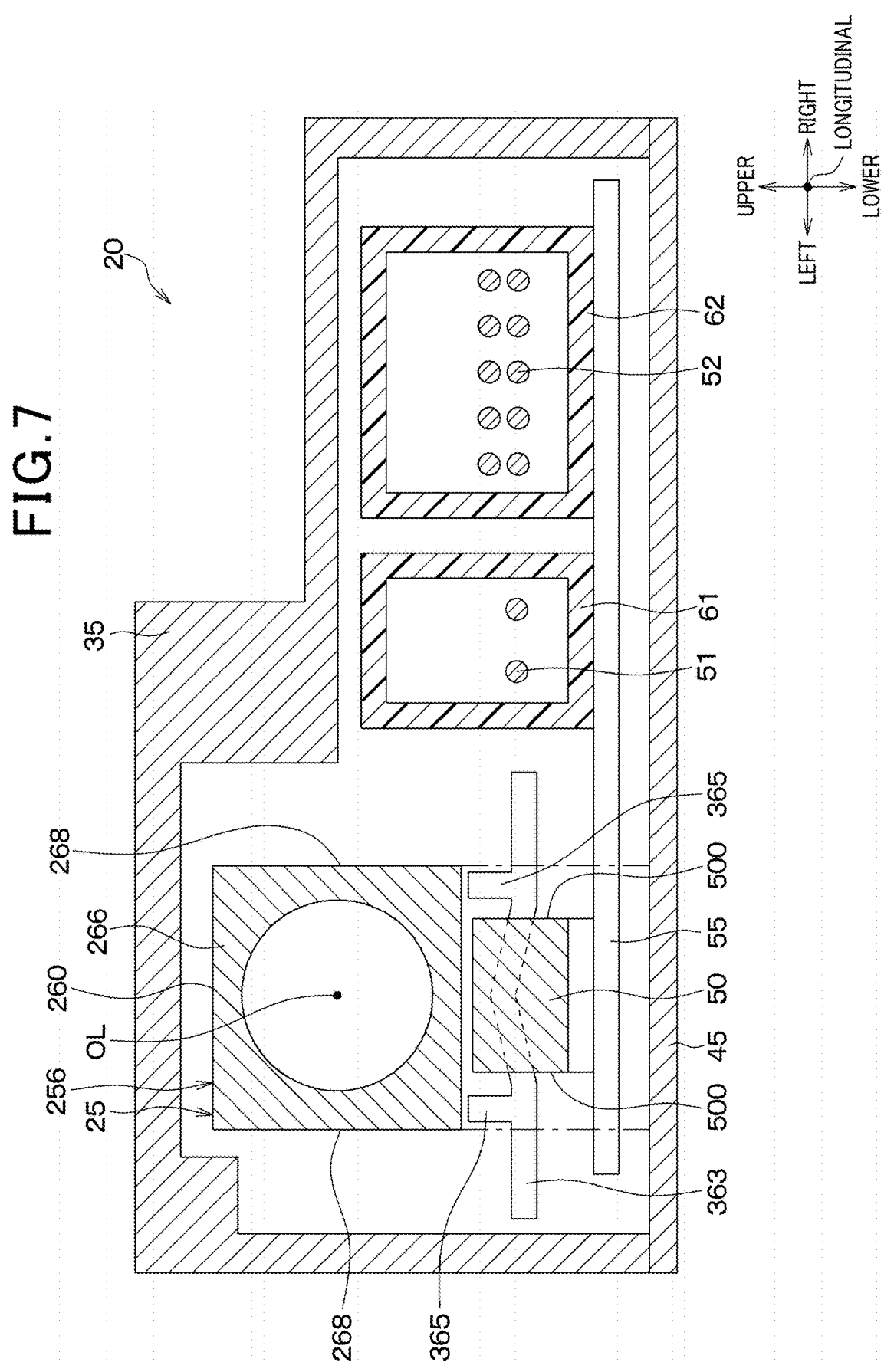
FIG. 7 is a cross sectional view of an imaging device according to another embodiment.

The holder 256 in each of the above embodiments is designed to have the first flange 271 extending in the rightward direction of the vehicle 10 and the second the second flange 272 extending in the leftward direction of the vehicle 10. The holder ends 268, therefore, corresponds to ends of the first flange 271 and the second flange 272. Portions of the lateral ends of the holder 256 (which are also referred to as the holder ends 268 in this disclosure) excluding the first flange 271 and the second flange 272 or the lateral ends of the holder 256 in the absence of the first flange 271 and the second flange 272 correspond to ends of the connecting holder body 266. In this layout, the protruding portions 365 are, as illustrated in FIG. 7, arranged between the connecting member ends 500 and the holder ends 268 corresponding to the ends of the connecting holder body 266 in the lateral direction of the vehicle 10.

The above embodiments may be combined in possible ways.

UNIQUE ASPECTS OFFERED BY THIS DISCLOSURE

First Aspect

An imaging device is provided which comprises: (a) a camera module (25) which includes a lens (250), a holder (256) in which the lens is disposed, and an image sensor (254) which captures an image using light having passed through the lens and outputs the captured image in a form of an electrical signal; (b) a board (55) which derives the electrical signal from the image sensor; (c) a case (35); and (d) a cover (45) which defines an inner chamber along with the case in which the lens, the holder, and the image sensor are disposed. The case includes an opening-defining portion (350) which defines an opening through which the holder is inserted. The opening-defining portion includes a first wall (361), a second wall (362), and a shield (363). The first wall is located between the holder and the board. The second wall is arranged on an opposite side of the holder to the first wall. The shield extends from the first wall in a first direction and is located between the holder and the board in the inner chamber defined by the case and the cover.

Second Aspect

The imaging device as set forth in "FIRST ASPECT", wherein the shield is formed integrally with the first wall.

Third Aspect

The imaging device as set forth in "FIRST ASPECT" or "SECOND ASPECT", wherein the first direction is a direction in which an optical axis (OL) of the lens extends.

Fourth Aspect

The imaging device as set forth in "FIRST ASPECT" or "SECOND ASPECT", wherein the shield is oriented to slant relative to an optical axis (OL) of the lens to have a first distance (L1) smaller than a second distance (L2). The first distance is a distance between an end (3630) of the shield and the holder in a direction traversing the optical axis. The end of the shield faces in the first direction. The second distance is a distance between the holder and a boundary (370) of the shield and the first wall in the direction traversing the optical axis.

Fifth Aspect

The imaging device as set forth in "FIRST ASPECT" or "SECOND ASPECT", wherein the second wall includes a holder-facing surface (367) and an outer surface (369). The holder-facing surface is oriented to face the holder in a direction traversing an optical axis (OL) of the lens. The outer surface extends to intersect the holder-facing surface, connects with the holder-facing surface, and faces outside the case. The shield has an end (3630) which faces in the first direction and is located away from the outer surface in the first direction.

Sixth Aspect

The imaging device as set forth in "FIRST ASPECT" or "SECOND ASPECT", wherein an end (3630) of the shield which faces in the first direction is located away from an end (550) of the board in the first direction.

Seventh Aspect

The imaging device as set forth in "FIRST ASPECT" or "SECOND ASPECT", wherein the board is defined as a first board. The camera module also includes a second board (252) on which the image sensor is mounted. The imaging device further comprises a connecting member (50) which connects with the first board and the second board. The holder includes holder ends (268) which face in a second direction extending perpendicular both to a direction in which an optical axis (OL) of the lens extends and to a direction oriented from the first wall to the second wall. A joint of the connecting member and the second board is located away from the shield in the first direction. The connecting member includes connecting member ends (500) which face in the second direction. The connecting member ends are located more inward than the holder ends in the second direction. The opening-defining portion includes protruding portions (365) which extends in a direction from the shield toward the holder. Each of the protruding portions is located between one of the holder ends and one of the connecting ends.

Eighth Aspect

The imaging device as set forth in "FIRST ASPECT" or "SECOND ASPECT", wherein the board is defined as a first board. The camera module also includes a second board (252) on which the image sensor is mounted. The imaging device further comprises a connecting member (50) which connects with the first board and the second board. A joint of the connecting member and the second board is located away from the shield in the first direction. The shield is oriented to slant in a second direction perpendicular both to a direction in which an optical axis (OL) of the lens extends and to a direction oriented from the first wall to ward the second wall.

Ninth Aspect

The imaging device as set forth in "FIRST ASPECT" or "SECOND ASPECT", wherein the second wall is located away from the first wall in the first direction.

What is claimed is:

1. An imaging device comprising:
   a camera module which includes a lens, a holder in which the lens is disposed, and an image sensor which captures an image using light having passed through the lens and outputs the captured image in a form of an electrical signal;
   a board which derives the electrical signal from the image sensor;
   a case; and
   a cover which defines an inner chamber along with the case in which the lens, the holder, the image sensor, and the board are disposed, wherein
   the case includes an opening-defining portion which defines an opening through which the holder is inserted, the opening-defining portion includes a first wall, a second wall, and a shield, the first wall being located between the holder and the board, the second wall being arranged on an opposite side of the holder to the first wall, the shield extending from the first wall in a first direction and being located between the holder and the board in the inner chamber defined by the case and the cover.

2. The imaging device as set forth in claim 1, wherein the shield is formed integrally with the first wall.

3. The imaging device as set forth in claim 1, wherein the first direction is a direction in which an optical axis (OL) of the lens extends.

4. The imaging device as set forth in claim 1, wherein the shield is oriented to slant relative to an optical axis (OL) of the lens to have a first distance (L1) smaller than a second distance (L2), the first distance being a distance between an end of the shield and the holder in a direction traversing the optical axis, the end of the shield facing in the first direction, the second distance being a distance between the holder and a boundary of the shield and the first wall in the direction traversing the optical axis.

5. The imaging device as set forth in claim 1, wherein the second wall includes a holder-facing surface and an outer surface, the holder-facing surface being oriented to face the holder in a direction traversing an optical axis (OL) of the lens, the outer surface extending to intersect the holder-facing surface, connecting with the holder-facing surface, and facing outside the case,
   the shield has an end which faces in the first direction and is located away from the outer surface in the first direction.

6. The imaging device as set forth in claim 1, wherein an end of the shield which faces in the first direction is located away from an end of the board in the first direction.

7. The imaging device as set forth in claim 1, wherein the board is defined as a first board,
   the camera module also includes a second board on which the image sensor is mounted, and further comprising,
   a connecting member which connects with the first board and the second board, and wherein
   the holder includes holder ends which face in a second direction extending perpendicular both to a direction in which an optical axis (OL) of the lens extends and to a direction oriented from the first wall to the second wall,
   a joint of the connecting member and the second board is located away from the shield in the first direction,
   the connecting member includes connecting member ends which face in the second direction,
   the connecting member ends are located more inward than the holder ends in the second direction,
   the opening-defining portion includes protruding portions which extends in a direction from the shield toward the holder,
   each of the protruding portions is located between one of the holder ends and one of the connecting member ends.

8. The imaging device as set forth in claim 1, wherein the board is defined as a first board,
   the camera module also includes a second board on which the image sensor is mounted, and further comprising,
   a connecting member which connects with the first board and the second board, and wherein
   a joint of the connecting member and the second board is located away from the shield in the first direction,
   the shield is oriented to slant in a second direction perpendicular both to a direction in which an optical axis (OL) of the lens extends and to a direction oriented from the first wall to ward the second wall.

9. The imaging device as set forth in claim 1, wherein the second wall is located away from the first wall in the first direction.

* * * * *